United States Patent
Satoh

(10) Patent No.: US 6,977,904 B2
(45) Date of Patent: Dec. 20, 2005

(54) PACKET COMMUNICATION CHARGE PRE-NOTIFICATION SYSTEM

(75) Inventor: Kazunori Satoh, Tokyo (JP)

(73) Assignee: NEC Corporation, Tokyo (JP)

( * ) Notice: Subject to any disclaimer, the term of this patent is extended or adjusted under 35 U.S.C. 154(b) by 887 days.

(21) Appl. No.: 09/805,025

(22) Filed: Mar. 12, 2001

(65) Prior Publication Data

US 2001/0038625 A1 Nov. 8, 2001

(30) Foreign Application Priority Data

Mar. 14, 2000 (JP) .............................. 2000-069994

(51) Int. Cl.⁷ .......................................... G01R 31/08
(52) U.S. Cl. .................................... 370/252; 455/406
(58) Field of Search ............... 370/352; 455/405–408, 455/406; 379/114.01, 114.03, 114.17, 144.07, 379/144.08; 709/223; 705/400

(56) References Cited

U.S. PATENT DOCUMENTS

| | | | |
|---|---|---|---|
| 5,946,614 A * | 8/1999 | Robbins et al. | 455/407 |
| 6,098,878 A * | 8/2000 | Dent et al. | 235/380 |
| 6,112,099 A * | 8/2000 | Ketola | 455/466 |
| 6,246,870 B1 * | 6/2001 | Dent et al. | 455/405 |
| 6,493,547 B1 * | 12/2002 | Raith | 455/405 |
| 6,496,689 B1 * | 12/2002 | Keller et al. | 455/406 |
| 6,584,500 B1 * | 6/2003 | Arkko | 709/223 |

FOREIGN PATENT DOCUMENTS

| | | |
|---|---|---|
| JP | 62-234443 | 10/1987 |
| JP | 04-284746 | 10/1992 |
| JP | 06-188881 | 7/1994 |
| JP | 08-079307 | 3/1996 |
| JP | 08-331123 | 12/1996 |

OTHER PUBLICATIONS

Japanese Office Action dated Aug. 27, 2002 with partial English Translation.

* cited by examiner

Primary Examiner—Bob Phunkulh
Assistant Examiner—Robert W. Wilson
(74) Attorney, Agent, or Firm—Dickstein, Shapiro, Morin & Oshinsky, LLP

(57) ABSTRACT

A packet communication charge pre-notification system includes a mobile station, a packet communication network containing a mobile communication network connected to the mobile station by radio, and a terminal connected to the mobile station via the packet communication network. The mobile station has a control unit, counting unit, and display unit. The control unit forms packet data from digital data and transmits the packet data to the terminal via the packet communication network in accordance with transmission permission from the user. The counting unit counts the formed packet data before transmission. The display unit displays a communication charge calculated on the basis of the counting result of the counting unit before the packet data is transmitted.

11 Claims, 9 Drawing Sheets

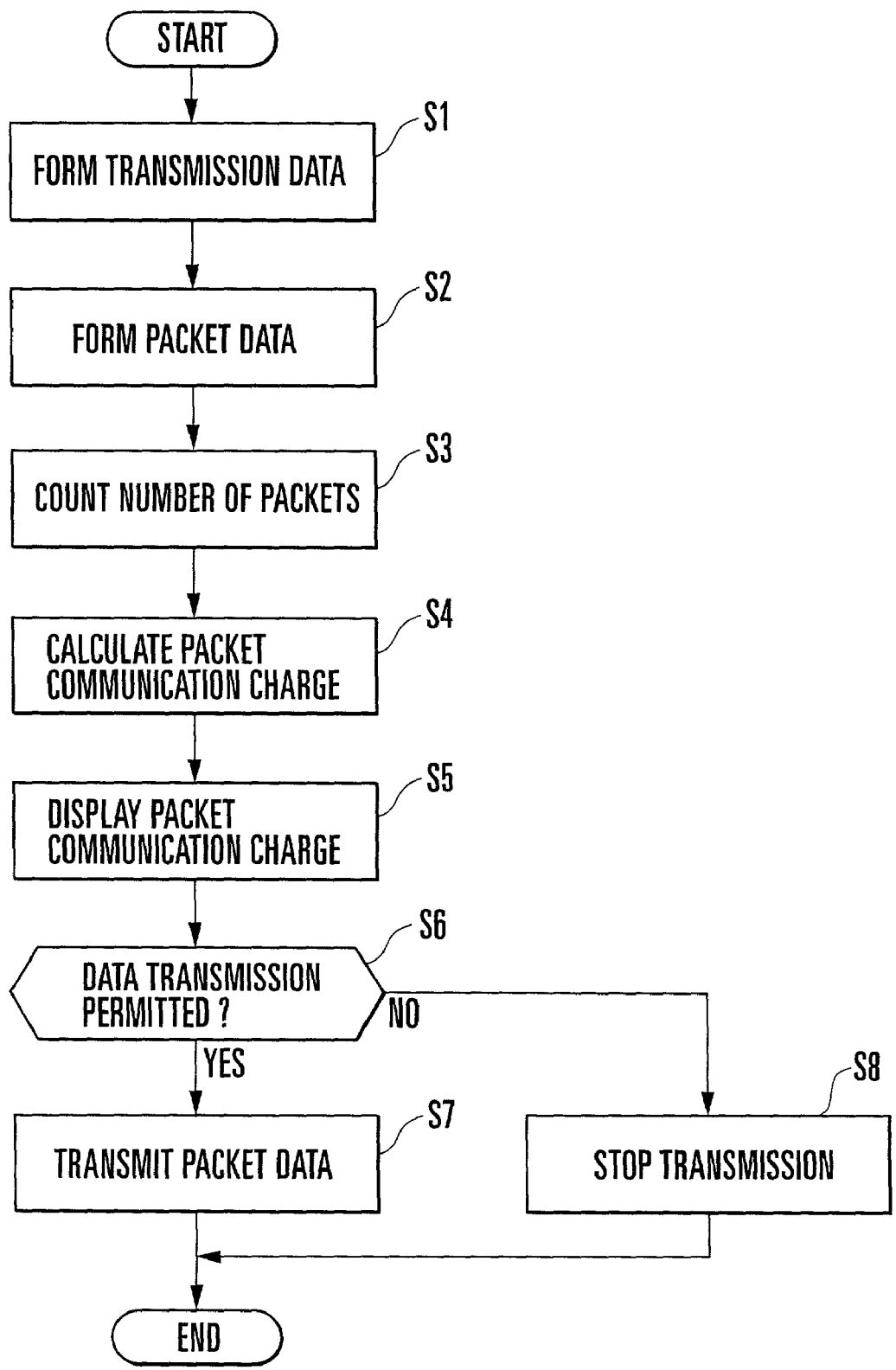
F I G. 2

PACKET COMMUNICATION CHARGE PRE-NOTIFICATION SYSTEM

BACKGROUND OF THE INVENTION

The present invention relates to packet communication using a mobile station such as a portable telephone and, more particularly, to a packet communication charge pre-notification system for notifying the user of a communication charge before transmitting packet data.

At present, various services using packet communication in mobile stations such as a portable telephone have been offered. The communication charge of a packet communication service is determined on the basis of not the communication time but the transmitted/received data amount. As a conventional method of obtaining the charging status of the packet communication charge, the user inquires the use status on a network. As another method, the user uses a packet dedicated device which always monitors the transmitted/received data amount and displays the results.

In the conventional methods, the user can know the past communication charge, but cannot know the communication charge of a service to be used. The user is sometimes confused by an unexpected high charge. To solve this, there is provided a mobile station which can use both a circuit switching service for speech communication or the like and a packet communication service, and displays an estimate of the previous/cumulative speech communication charge of the circuit switching service. However, there is no mobile station which allows the user to know the charging status (communication charge) as the sum of the charges of the two services. This is inconvenient for the user.

SUMMARY OF THE INVENTION

It is an object of the present invention to provide a packet communication charge pre-notification system which allows the user to know an estimated communication charge before receiving a packet communication service in packet communication using a mobile station.

It is another object of the present invention to provide a packet communication charge pre-notification system which allows the user to easily know the sum of the charges of a circuit switching service and packet communication service of a mobile station.

To achieve the above objects, according to the present invention, there is provided a packet communication charge pre-notification system including a mobile station, a packet communication network containing a mobile communication network connected to the mobile station by radio, and a terminal connected to the mobile station via the packet communication network, the mobile station comprising control means for forming packet data from digital data and transmitting the packet data to the terminal via the packet communication network in accordance with transmission permission from a user, counting means for counting the formed packet data before transmission, and display means for displaying a communication charge calculated on the basis of a counting result of the counting means before the packet data is transmitted.

BRIEF DESCRIPTION OF THE DRAWINGS

FIG. 2 is a flow chart showing operation of notifying the user of a communication charge before packet data is transmitted in the system shown in FIG. 1A;

DESCRIPTION OF THE PREFERRED EMBODIMENTS

The present invention will be described in detail below with reference to the accompanying drawings.

Figure 1A:
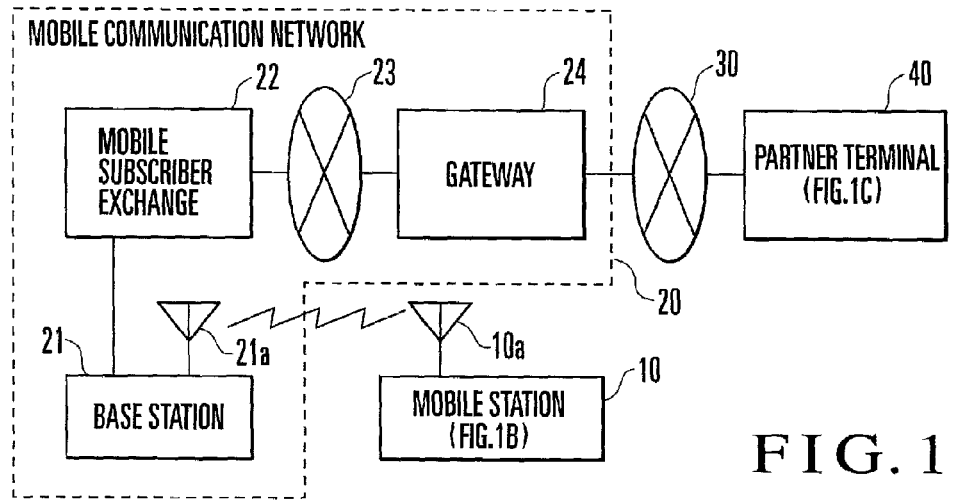
FIG. 1A is a block diagram showing the schematic arrangement of a communication network to which a packet communication charge pre-notification system according to the first embodiment of the present invention is applied.

FIG. 1A shows the schematic arrangement of a communication network to which a packet communication charge pre-notification system according to the first embodiment of the present invention is applied. In FIG. 1A, the communication network of the first embodiment is constituted by a mobile station 10 having an antenna 10a, a mobile communication network 20 which communicates with the mobile station 10 by radio, a packet data communication network 30 connected to the mobile communication network 20, and a partner terminal 40 connected to the packet data communication network 30. The mobile station 10 and partner terminal 40 are connected by packet communication via the mobile communication network 20 and packet data communication network 30.

The mobile communication network 20 comprises a base station 21 for transmitting/receiving radio signals to/from the mobile station 10 via an antenna 21a, a mobile subscriber exchange 22 connected to the base station 21, a digital communication network 23 connected to the mobile subscriber exchange 22, and a gateway 24 connected to the digital communication network 23. In this arrangement, the mobile communication network 20 is connected to the mobile station 10 via the base station 21 by radio, and connected to the packet data communication network 30 via the gateway 24. The mobile communication network 20 selectively provides the mobile station 10 with a circuit switching service for speech communication or the like and a packet switching service. The mobile station 10 can selectively receive the circuit switching service and packet switching service.

Figure 1B:
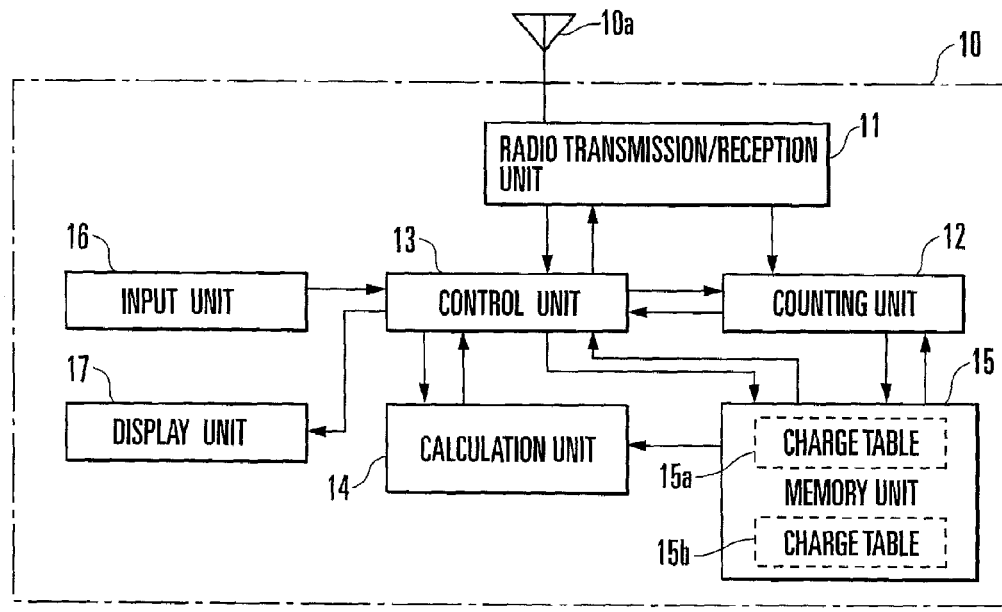
FIG. 1B is a block diagram of a mobile station shown in FIG. 1A.

As shown in FIG. 1B, the mobile station 10 has a radio transmission/reception unit 11, counting unit 12, control unit 13, calculation unit 14, memory unit 15, input unit 16, and display unit 17. The radio transmission/reception unit 11 transmits data sent from the control unit 13 to the base station 21 via the antenna 10a. Further, the radio transmission/reception unit 11 receives data transmitted from the base station 21 via the antenna 10a and sends it to the control unit 13. Of received data, packet data is sent from the radio transmission/reception unit 11 to the counting unit 12 in accordance with an instruction from the control unit 13.

The counting unit 12 is formed from a byte counter. The counting unit 12 counts the data amount of packet communication data in accordance with a byte counting signal output from the control unit 13, ends counting operation in accordance with a byte counting end signal output from the control unit 13, and writes the counting result in the memory unit 15.

The memory unit 15 is formed from a nonvolatile memory such as a flash memory, and stores information about the communication charge or the counting result of the data amount of packet data before transmission. Information about the communication charge includes information about the circuit switching service and information about the packet switching service. Information about the circuit switching service includes speech communication start time, speech communication end time, a partner's telephone number, a charge table 15a for calculating a communication charge from these pieces of information, and a calculated communication charge.

Information about the packet switching service includes partner's address information, data amount information such as the data amount of transmitted packet data or the number of packets, data amount information such as the data amount of received packet data or the number of packets, a charge table 15b for calculating a packet communication charge from these pieces of information, and a calculated packet communication charge.

The calculation unit 14 calculates the charge in accordance with a charge calculation instruction from the control unit 13 by reading out from the memory unit 15 communication charge information or the counting result of the data amount of packet data before transmission. Then, the calculation unit 14 stores the calculated charge in the memory unit 15. The input unit 16 is made up of operation keys such as a numeric key pad and function keys for inputting an instruction and data. The user manipulates the mobile station 10 by using the operation keys.

The display unit 17 is formed from a liquid crystal display having an information display screen, and displays the packet communication charge before data transmission or the cumulative charge in accordance with input operation of the user to the input unit 16. The control unit 13 functions as an information processing means, processes an instruction and data input from the input unit 16 and radio transmission/reception unit 11, and outputs the processing result to the display unit 17 and radio transmission/reception unit 11.

Figure 1C:
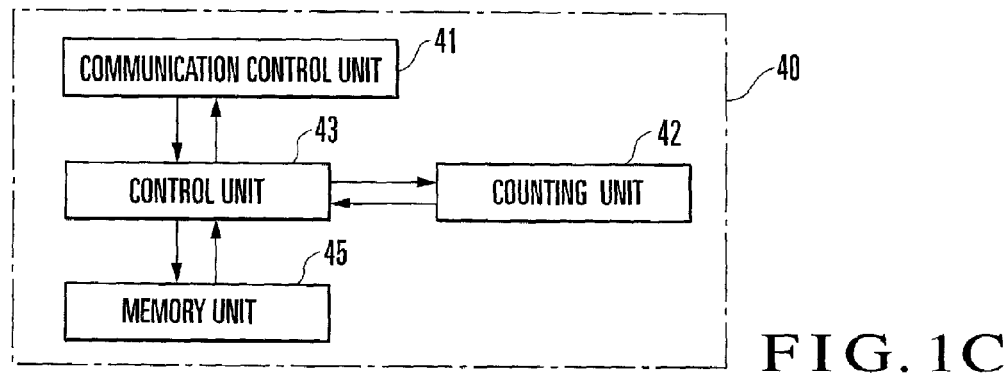
FIG. 1C is a block diagram of a partner terminal shown in FIG. 1A.

As shown in FIG. 1C, the partner terminal 40 is comprised of a communication control unit 41, counting unit 42, control unit 43, and memory unit 45. The communication control unit 41 transmits data sent from the control unit 43 to the packet data communication network 30. In addition, the communication control unit 41 receives data from the packet data communication network 30 and sends it to the control unit 43. The counting unit 42 is formed from a byte counter. The counting unit 42 counts the data amount of packet communication data output from the control unit 43, and outputs the counting result to the control unit 43. The memory unit 45 is a writable/readable memory unit such as a hard disk.

The control unit 43 extracts original data from the received packet data and stores it in the memory unit 45. The control unit 43 reads out data stored in the memory unit 45 to generate packet data in accordance with a request from the connected terminal (mobile station 10), and transmits the packet data or the result of counting the generated packet data by the counting unit 42.

Transmission operation and reception operation of the packet communication charge pre-notification system having this arrangement will be separately explained.

Communication charge notification operation in the mobile station 10 before packet data is transmitted will be described with reference to FIG. 2. Assume that communication with the partner terminal 40 has already started by a call from the mobile station 10, and the mobile station 10 is charged a communication charge. This also applies to operations in FIGS. 3 to 5.

In step S1, data to be transmitted to the partner terminal 40 is formed in accordance with input of data and an instruction by the user (subscriber) via the input unit 16 of the mobile station 10. In step S2, the control unit 13 forms packet data from the formed transmission data. In step S3, the counting unit 12 counts the number of packets of the packet data in accordance with a byte counting signal from the control unit 13. In step S4, the calculation unit 14 calculates a packet communication charge from the counted number of packets by looking up the charge table 15b stored in the memory unit 15.

In step S5, the display unit 17 displays the calculated communication charge. In step S6, the control unit 13 determines permission/denial of data transmission. If the user performs permission operation, step S7 is executed; if he/she performs denial operation, step S8 is executed. In step S7, the control unit 13 transmits the packet data formed in step S2 and ends the operation. In step S8, the control unit 13 stops transmission of the packet data and ends the processing.

Figure 3:
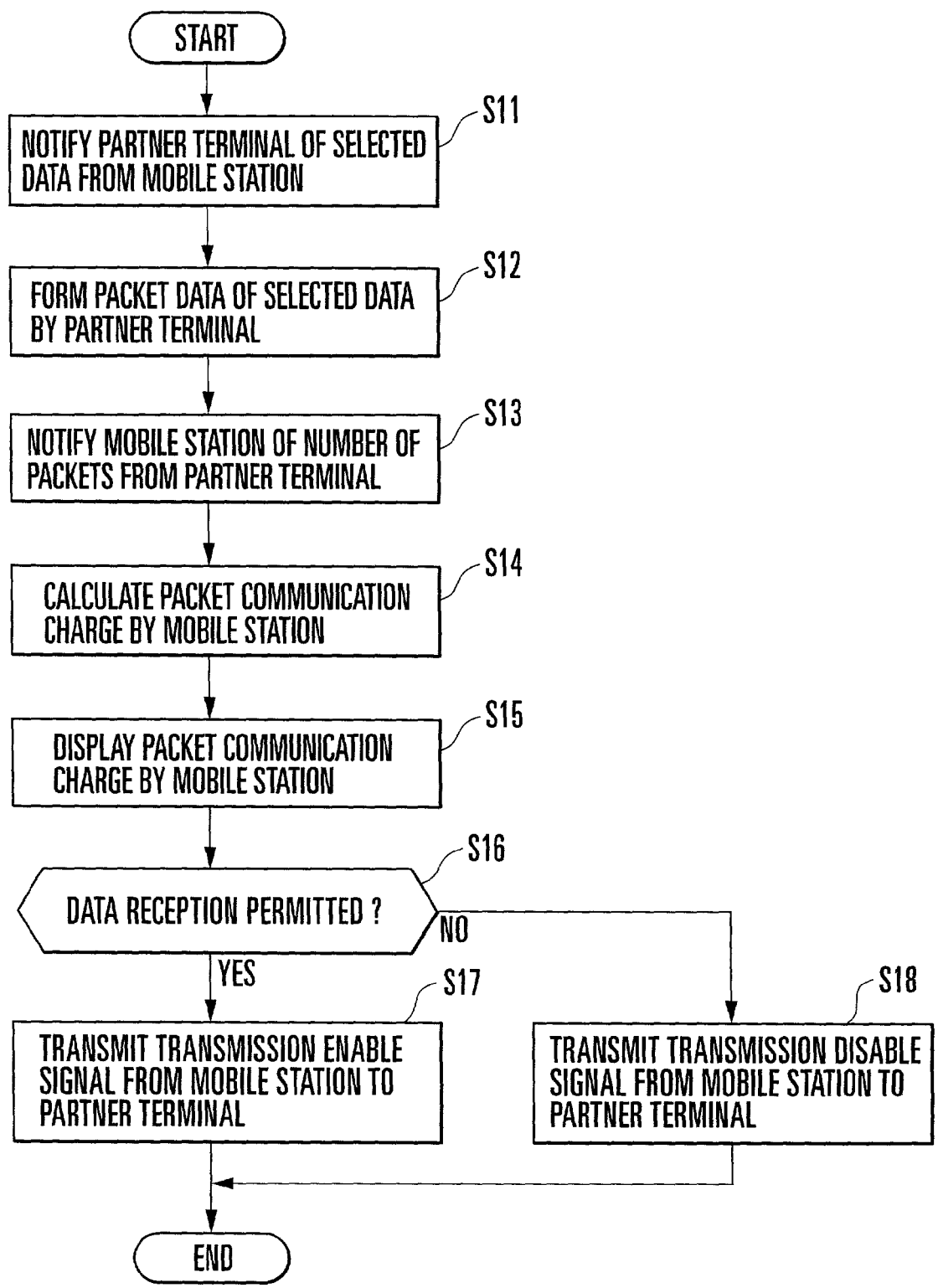
FIG. 3 is a flow chart showing operation of notifying the user of a communication charge before packet data is received in the system shown in FIG. 1A.

Communication charge notification operation before packet data is received will be described with reference to FIG. 3.

In step S11, data to be extracted from data which was transmitted from the partner terminal 40 and is displayed on the display unit 17 of the mobile station 10 is selected. Then, the control unit 13 notifies the partner terminal 40 of the selected data in accordance with input of a communication charge confirmation instruction. Data selection operation and communication charge confirmation instruction input are done by the user via the input unit 16. In step S12, packet data of the notified selected data is formed in the partner terminal 40.

In step S13, the number of packets of the formed packet data is counted in the partner terminal 40, and the mobile station 10 is notified of the counting result. In step S14, the control unit 13 sends the counting result received by the radio transmission/reception unit 11 to the calculation unit 14 in the mobile station 10, and the calculation unit 14 calculates a communication charge from the notified number of packets by looking up the charge table 15b of the memory unit 15.

In step S15, the display unit 17 displays the calculated communication charge. In step S16, the control unit 13 determines permission/denial of data reception. If the user performs permission operation, step S17 is executed; if he/she performs denial operation, step S18 is executed. In step S17, the control unit 13 transmits a packet data transmission enable signal to the partner terminal 40 and ends the operation. In step S18, the control unit 13 transmits a packet data transmission disable signal to the partner terminal 40 and ends the processing.

Figure 4:
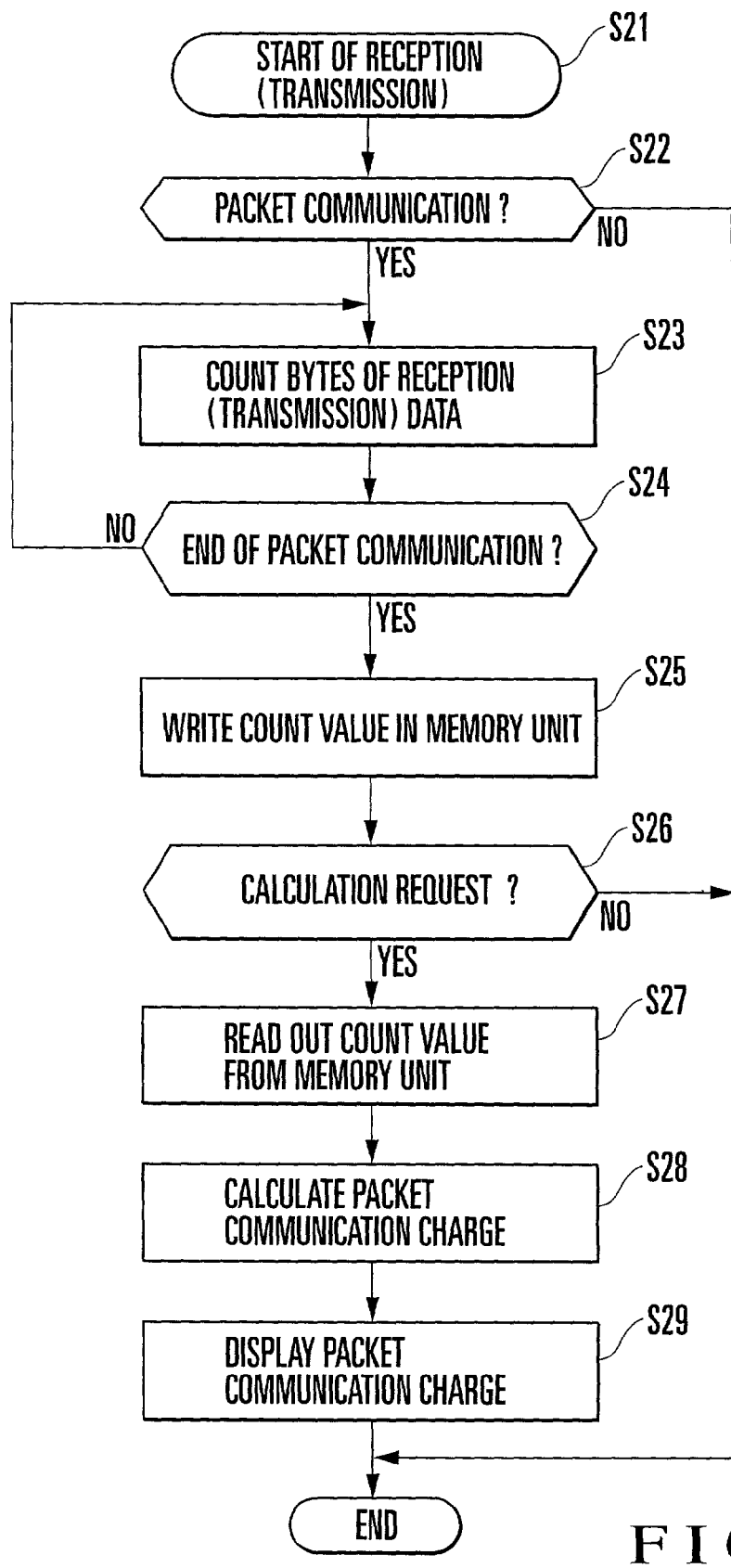
FIG. 4 flow chart showing operation of notifying the user of a communication charge after packet data is received/transmitted in the system shown in FIG. 1A.

Communication charge notification operation in the mobile station 10 after data transmission/reception will be explained with reference to FIG. 4.

In step S21, data reception/transmission starts. In step S22, the control unit 13 checks whether data is received/transmitted by packet communication. If YES in step S22, step S23 is executed; if NO, no notification operation is done, and the operation ends. In step S23, the bytes of reception/transmission data are counted to count the number of packets. In this case, the counting unit 12 continues byte counting processing until the control unit 13 confirms the end of packet communication in step S24. After packet communication ends, the count value of the counting result is written in the memory unit 15 in step S25.

In step S26, the control unit 13 confirms whether the user issued a communication charge notification request after data reception/transmission before the start of data reception/transmission. If YES in step S26, step S27 is executed; if NO, processing ends. In step S27, the calculation unit 14 reads out the count value written in step S25 from the memory unit 15. In step S28, the calculation unit 14 calculates a packet communication charge from the count value read out in step S27 by looking up the charge table 15b of the memory unit 15. In step S29, the control unit 13 outputs the calculation result of the calculation unit 14 to the display unit 17 where the packet communication charge of the received/transmitted data is displayed.

Figure 5:
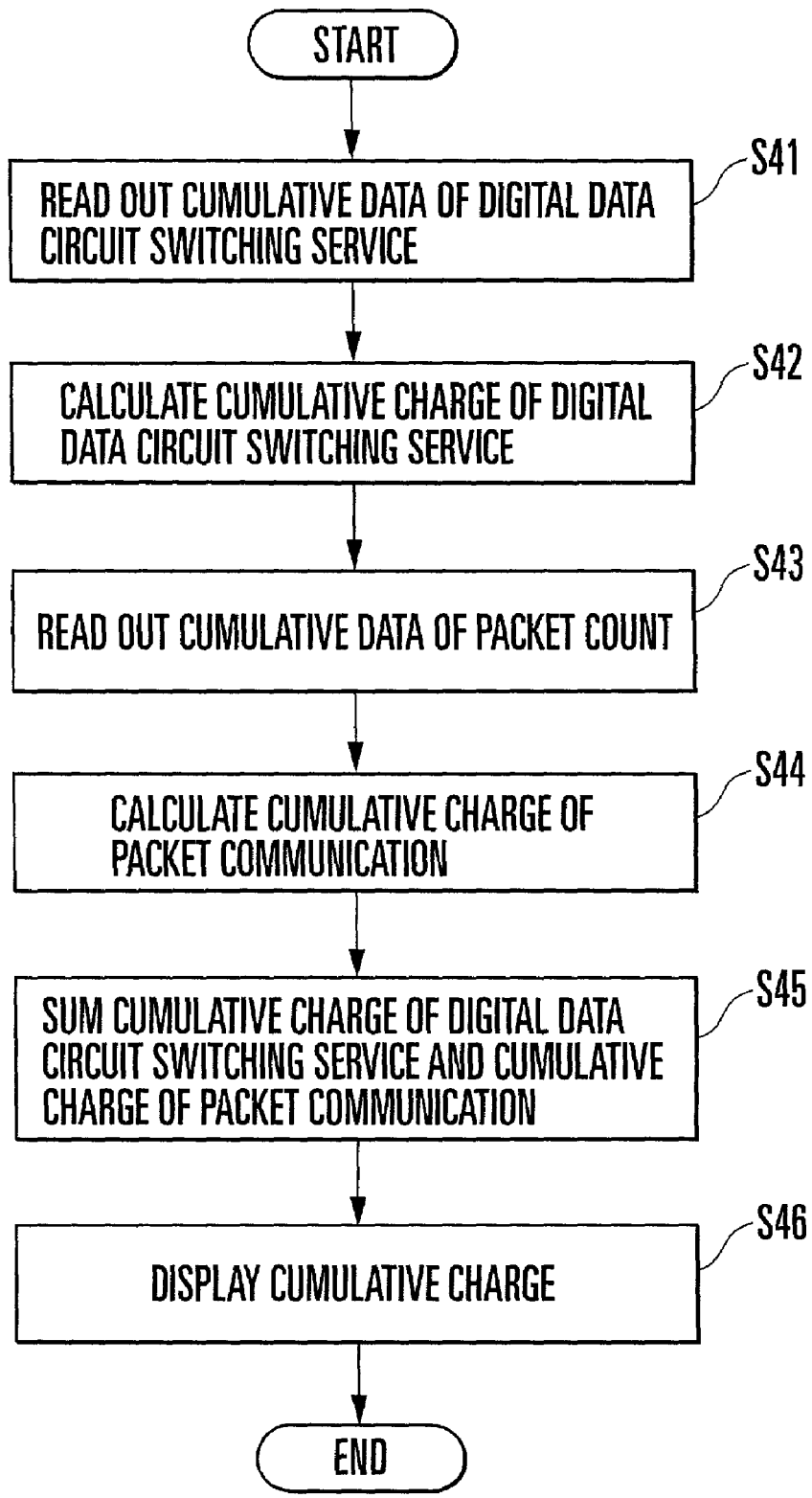
FIG. 5 is a flow chart showing operation of notifying the user of a cumulative communication charge in the system shown in FIG. 1A.

Cumulative communication charge notification operation will be described with reference to FIG. 5. This notification operation starts when the user inputs a cumulative communication charge confirmation instruction via the input unit 16 of the mobile station 10. Note that the memory capacity of the memory unit 15 is determined such that the cumulative period can be set to at least one month.

In step S41, the calculation unit 14 reads out cumulative data of speech communication start time, speech communication end time, and a partner's telephone number that are stored in the circuit switching service memory area of the memory unit 15. Note that cumulative data recording operation is the same as a conventional operation, and a description thereof will be omitted. In step S42, the calculation unit 14 calculates the cumulative speech communication charge of the circuit switching service from the cumulative data read out in step S41 by looking up the circuit switching service charge table 15a stored in the memory unit 15.

In step S43, the calculation unit 14 reads out cumulative data of a packet count stored in the packet switching service memory area of the memory unit 15. This cumulative data is a count value written in step S25 of FIG. 4. In step S44, the calculation unit 14 looks up the charge table 15b of the memory unit 15, and calculates the cumulative communication charge of the packet switching service from the cumulative data of the packet count read out in step S43.

In step S45, the calculation unit 14 calculates the sum of the cumulative speech communication charge of the circuit switching service and the communication charge of the packet switching service. In step S46, the control unit 13 outputs the calculated speech communication charge of the circuit switching service, the calculated communication charge of the packet switching service, and the calculated sum of these charges to the display unit 17 where these cumulative charges are displayed.

According to the first embodiment, the user can know a packet communication charge before transmitting/receiving packet data, and can determine whether to use the service. The user can know the sum of the cumulative speech communication charge of the circuit switching service and the cumulative communication charge of the packet switching service. This can prevent a high charge by refraining from using services or the like, and can increase the convenience of the user. A function which realizes this system need not be added to a communication network, so that the user can use this system regardless of a communication network in use.

Figure 6A:
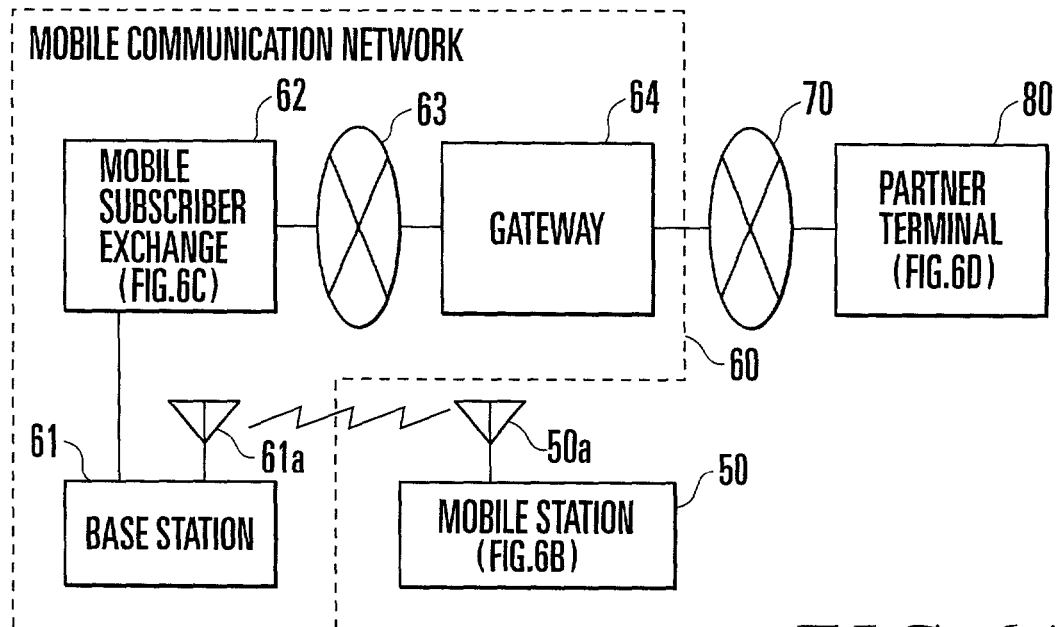
FIG. 6A is a block diagram showing the schematic arrangement of a communication network to which a packet communication charge pre-notification system according to the second embodiment of the present invention is applied.

FIG. 6A shows the schematic arrangement of a communication network to which a packet communication charge pre-notification system according to the second embodiment of the present invention is applied. Similar to the first embodiment, the communication network of the second embodiment is constituted by a mobile station 50, mobile communication network 60, packet data communication network 70, and partner terminal 80. The mobile station 50 and partner terminal 80 are connected to enable packet communication via the mobile communication network 60 and packet data communication network 70. Reference numerals 50a and 61a denote antennas.

Figure 6B:
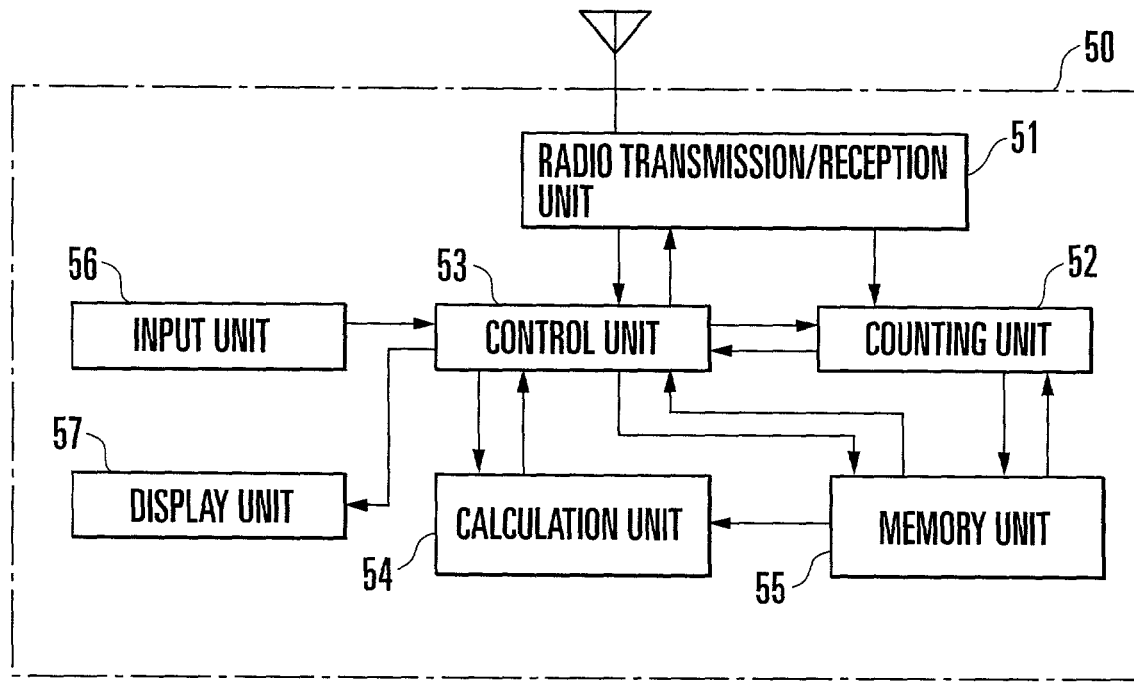
FIG. 6B is a block diagram of a mobile station shown in FIG. 6A.

The system of the second embodiment is different from that of the first embodiment in that a side which provides a packet switching service notifies a charging target side of a packet communication charge before packet data is transmitted. As shown in FIG. 6B, the mobile station 50 comprises a radio transmission/reception unit 51, counting unit 52, control unit 53, calculation unit 54, memory unit 55, input unit 56, and display unit 57. The mobile station 50 has the same basic arrangement as that in the first embodiment. In FIG. 6B, unlike the first embodiment, the control unit 53 notifies the mobile communication network 60 via the radio transmission/reception unit 51 of the number of packets counted by the counting unit 52, instead of calculating a packet communication charge by the calculation unit 54. The mobile communication network 60 calculates a packet communication charge, and the packet communication charge sent from the mobile communication network 60 is displayed on the display unit 57.

A mobile subscriber exchange 62 of the mobile communication network 60 calculates a packet communication charge on the basis of packet count data to be transmitted before packet data is transmitted, and notifies the charging target side of the packet communication charge. As shown in FIG. 6C, the mobile subscriber exchange 62 is constituted by a communication control unit 65, charging control unit 67, calculation unit 66, and memory unit 68. The communication control unit 65 receives packet count data transmitted from the mobile station 50 or partner terminal 80, and outputs it to the charging control unit 67. Moreover, the communication control unit 65 transmits packet communication charge data output from the charging control unit 67 to the charging target side.

The charging control unit 67 controls the communication control unit 65, calculation unit 66, and memory unit 68, calculates a packet communication charge from the packet count data, and outputs the calculated packet communication charge to the communication control unit 65. In accordance with a charge calculation instruction from the charging control unit 67, the calculation unit 66 calculates a charge from the packet count data sent from the charging control unit 67 and communication charge information read out from the memory unit 15. The calculation unit 66 outputs the calculated charge to the charging control unit 67. The memory unit 68 stores information necessary to communicate with the mobile station 50 and charge the mobile station 50, such as communication charge information, subscriber information, and information about a base station 61 connected to the mobile station 50.

Figure 6D:
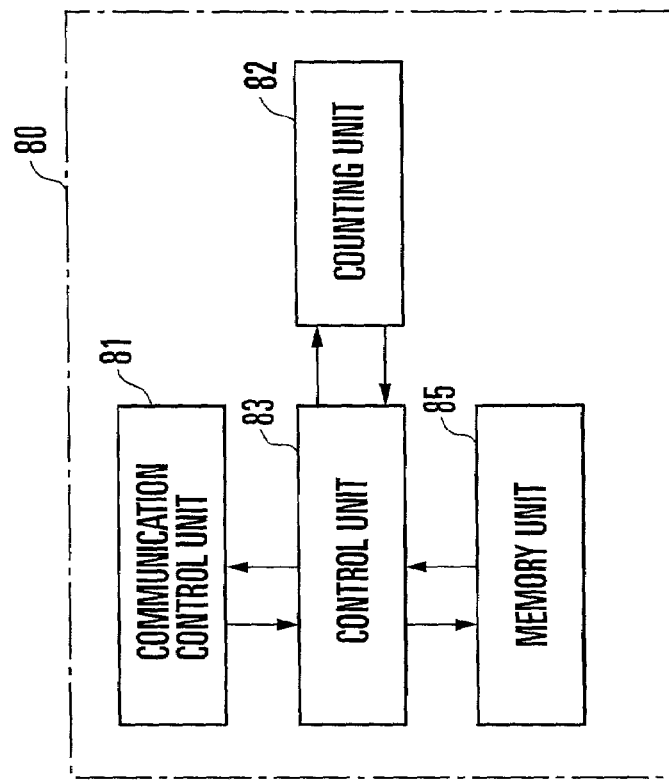
FIG. 6D is a block diagram of a partner terminal shown in FIG. 6A.
Figure 6C:
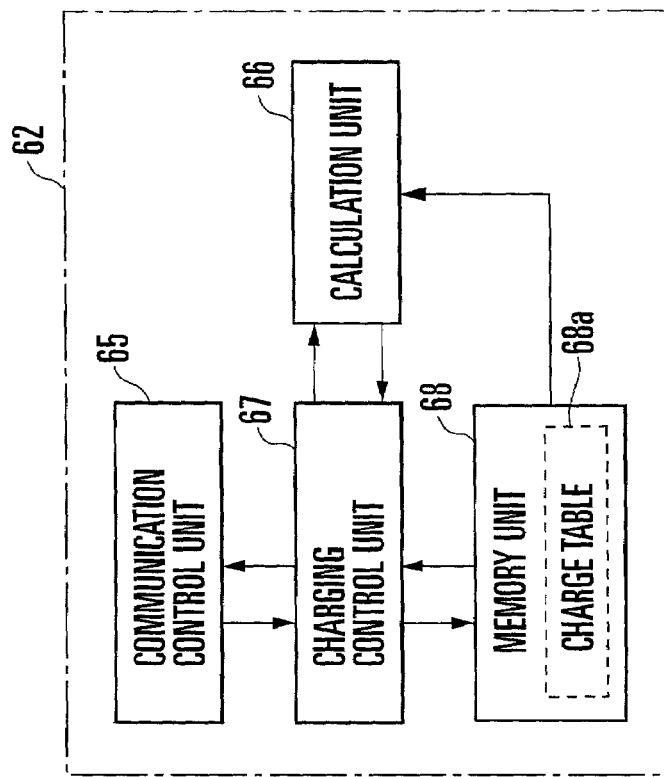
FIG. 6C is a block diagram of a mobile subscriber exchange shown in FIG. 6A.

As shown in FIG. 6D, the partner terminal 80 comprises a communication control unit 81, counting unit 82, control unit 83, and memory unit 85. The partner terminal 80 is the same as that in the first embodiment, and a description thereof will be omitted.

Transmission operation and reception operation of the packet communication charge pre-notification system having this arrangement will be separately explained.

Figure 7:
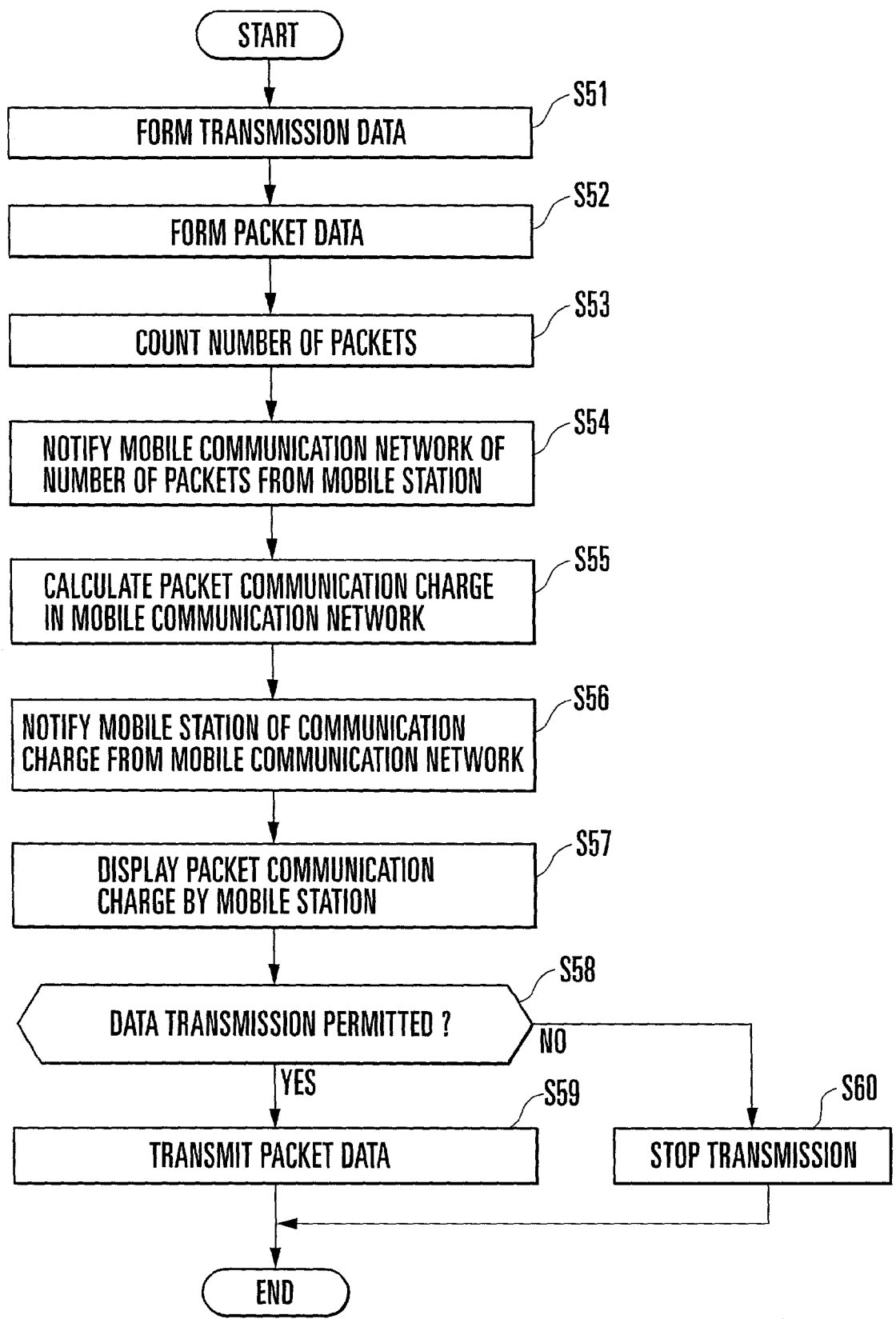
FIG. 7 is a flow chart showing operation of notifying the user of a communication charge before packet data is transmitted in the system shown in FIG. 6A.

Communication charge notification operation before packet data is transmitted will be described with reference to FIG. 7. Assume that communication with the partner terminal 80 has already started by a call from the mobile station 50, and the mobile station 50 is charged a communication charge. This also applies to an operation in FIG. 8.

In step S51, data to be transmitted to the partner terminal 80 is formed in the mobile station 50 in accordance with input of data and an instruction by the user (subscriber) via the input unit 56. In step S52, the control unit 53 forms packet data from the formed data. In step S53, the counting unit 52 counts the number of packets of the packet data. In step S54, the control unit 53 notifies the mobile communication network 60 of the counting result via the radio transmission/reception unit 51.

In step S55, the calculation unit 66 of the mobile subscriber exchange 62 calculates a packet communication charge from the notified number of packets. In this case, similar to the first embodiment, the packet communication charge is calculated by looking up a charge table 68a of the memory unit 68 in accordance with the number of packets. In step S56, the charging control unit 67 of the mobile subscriber exchange 62 notifies the mobile station 50 of the calculated packet communication charge via the base station 61. In step S57, the display unit 57 displays the notified packet communication charge in the mobile station 50.

In step S58, the control unit 53 determines permission/denial of data transmission. If the user performs permission operation, step S59 is executed; if he/she performs denial operation, step S60 is executed. In step S59, the control unit 53 transmits the packet data formed in step S52 and ends the operation. In step S60, the control unit 53 stops transmission of the packet data and ends the processing.

Figure 8:
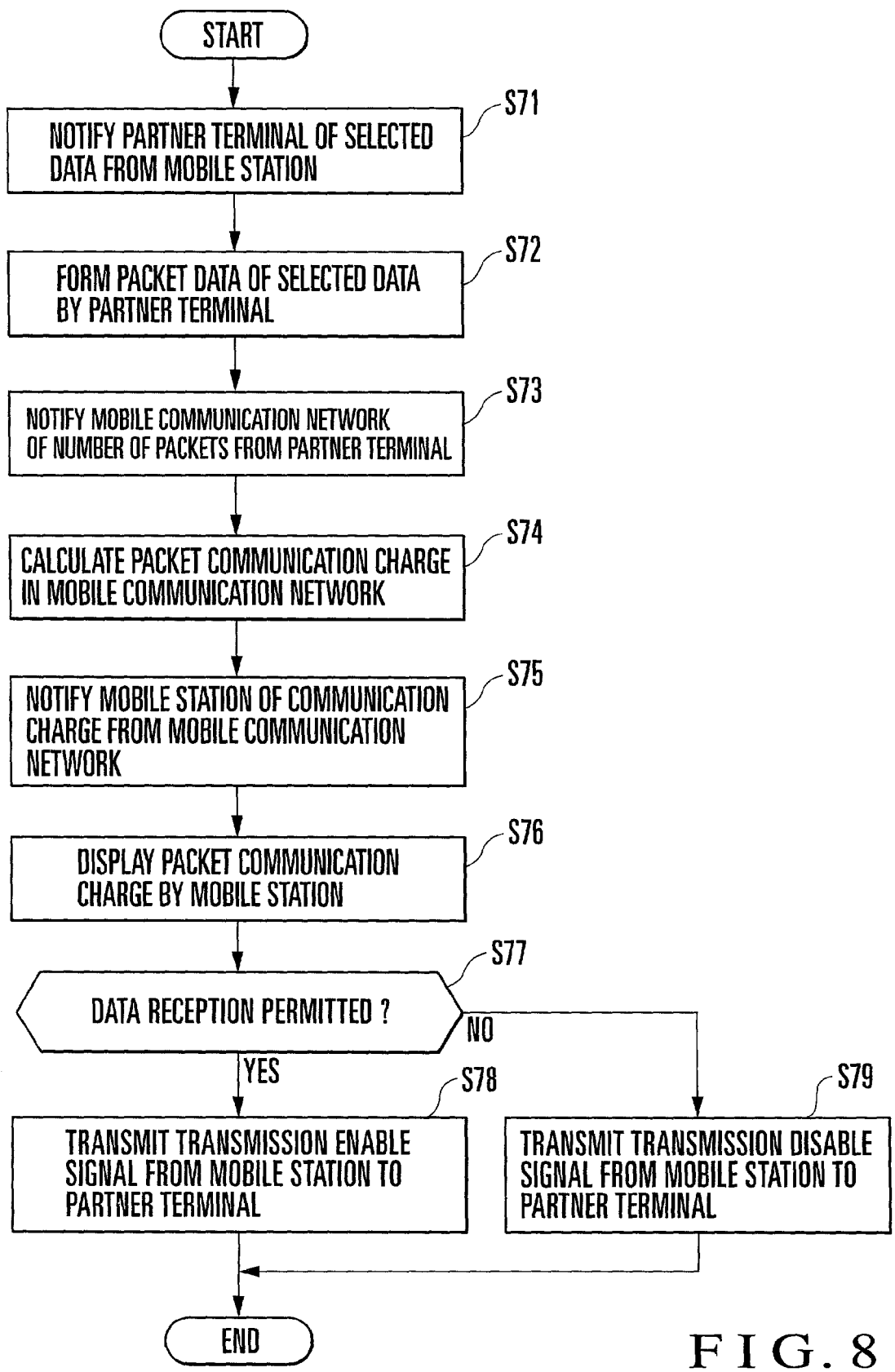
FIG. 8 is a flow chart showing operation of notifying the user of a communication charge before packet data is received in the system shown in FIG. 6A.

Communication charge notification operation before packet data is received will be described with reference to FIG. 8.

In step S71, the user selects data to be extracted from data which was transmitted from the partner terminal 80 and is displayed on the display unit 57 of the mobile station 50. After that, the control unit 53 notifies the partner terminal 80 of the selected data in accordance with input of a communication charge confirmation instruction. In step S72, packet data of the notified selected data is formed in the partner terminal 80. In step S73, the number of packets of the packet data formed in the partner terminal 80 is counted, and the mobile communication network 60 is notified of the counting result via the packet data communication network 70.

In step S74, the calculation unit 66 of the mobile subscriber exchange 62 calculates a packet communication charge from the notified number of packets. In step S75, the charging control unit 67 of the mobile subscriber exchange 62 notifies the mobile station 50 of the calculated packet communication charge via the base station 61.

In step S76, the display unit 57 of the mobile station 50 displays the packet communication charge sent from the mobile subscriber exchange 62. In step S77, the control unit 53 determines permission/denial of data reception. If the user performs permission operation, step S78 is executed; if he/she performs denial operation, step S79 is executed. In step S78, the control unit 53 transmits a packet data transmission enable signal to the partner terminal 80 and ends the operation. In step S79, the control unit 53 transmits a packet data transmission disable signal to the partner terminal 80 and ends the processing.

Communication charge notification operation after data transmission/reception and cumulative communication charge notification operation in the second embodiment are the same as those in the first embodiment, and a description thereof will be omitted.

The second embodiment provides an additional service utilizing the charging function of the mobile subscriber exchange of the mobile communication network. This service can be used regardless of the type of device in use as far as a mobile station or terminal has a function corresponding to this service.

Each embodiment has exemplified a method using the number of packets for calculation of a packet communication charge. However, the present invention is not limited to this, and the method can be modified in accordance with the charging method of the packet communication network such that the method uses the data amount of packet data. The communication charge is displayed in both data transmission and data reception, but may be displayed in only transmission or reception. A warning can be displayed for data of a predetermined capacity or more (communication charge).

As has been described above, according to the present invention, the user can know an estimated communication charge before receiving a packet communication service, and the communication charge can be prevented from increasing excessively.

The user can easily know the charging status as the sum of the cumulative speech communication charge of the circuit switching service and the cumulative communication charge of packet communication. This eliminates the inconvenience of the user.

What is claimed is:

1. A packet communication charge pre-notification system including:
   a mobile station;
   a packet communication network containing a mobile communication network connected to said mobile station by radio; and
   a terminal connected to said mobile station via the packet communication network,
   said mobile station comprising:
   control means for forming packet data from digital data and transmitting the packet data to said terminal via the packet communication network in accordance with transmission permission from a user;
   counting means for counting the formed packet data before transmission; and
   display means for displaying a communication charge calculated on the basis of a counting result of said counting means before the packet data is transmitted.

2. A system according to claim 1, wherein
said mobile station further comprises charge calculation means for calculating a communication charge on the basis of the counting result of said counting means, and
said display means displays the communication charge output from said charge calculation means.

3. A system according to claim 2, wherein said charge calculation means comprises:
memory means which stores a first charge table for packet communication; and
calculation means for calculating a communication charge by looking up the first charge table in accordance with the counting result of said counting means before packet transmission.

4. A system according to claim 1, wherein
said mobile station further comprises transmission means for transmitting the counting result of said counting means to the packet communication network,
the packet communication network further comprises charge calculation means for calculating a communication charge on the basis of a counting result from said mobile station and notifying said mobile station of the communication charge, and
said display means displays the communication charge notified from the packet communication network.

5. A system according to claim 4, wherein said charge calculation means comprises:
memory means which stores a charge table for packet communication; and
calculation means for calculating a communication charge by looking up the charge table in accordance with the counting result transmitted from said mobile station.

6. A system according to claim 4, wherein
said terminal counts packet data to be transmitted from said terminal to said mobile station before transmission, and
said charge calculation means calculates a communication charge on the basis of a counting result from said terminal.

7. A system according to claim 1, wherein said control means transmits packet data in accordance with transmission permission from the user on the basis of a communication charge look-up result displayed on said display means.

8. A system according to claim 1, wherein
said counting means counts packet data while the packet data is being transmitted, and outputting a counting result after end of packet communication, and
said display means displays a packet communication charge calculated on the basis of the counting result of said counting means, and notifies the user of the packet communication charge after the packet data is transmitted.

9. A system according to claim 3, wherein
said memory means stores cumulative speech communication data of a circuit switching service, a second charge table, and a cumulative packet data amount of packet communication in addition to the first charge table,
said calculation unit calculates a cumulative communication charge of packet communication, a cumulative speech communication charge of the circuit switching service, and a sum of the cumulative charges by looking up the first and second charge tables in accordance with the cumulative packet data amount and the cumulative speech communication data, and
said display means displays at least the sum of the cumulative charges and notifies the user of a cumulative charge as the sum of the charges of the circuit switching service and packet communication.

10. A system according to claim 1, wherein said mobile station further comprises input means for allowing the user to input transmission permission.

11. A packet communication charge pre-notification system including:
a mobile station;
a packet communication network containing a mobile communication network connected to said mobile station by radio; and
a terminal connected to said mobile station via the packet communication network, comprising:
control means, installed in said mobile station, for forming packet data from digital data and transmitting the packet data to said terminal via the packet communication network in accordance with transmission permission from a user;
counting means, installed in one of said mobile station and said terminal, for counting the formed packet data before transmission;
memory means which is installed in one of said mobile station and the packet communication network and stores a charge table for packet communication;
calculation means, installed in one of said mobile station and the packet communication network, for calculating a communication charge by looking up the first charge table in accordance with a counting result of said counting means before packet transmission; and
display means, installed in said mobile station, for displaying the communication charge output from said calculation means before packet transmission.

* * * * *